3,484,472
Patented Dec. 16, 1969

3,484,472
METHOD OF MANUFACTURING TOLUENE DIISOCYANATE
Saburo Suzuki, Masaya Kurata, Akikazu Akiyoshi, Shozo Aoshima, Hirohiko Dan, and Norimichi Matsuoka, Kitakyushu-shi, Japan, assignors to Mitsubishi Chemical Industries Limited, Tokyo, Japan
No Drawing. Filed Jan. 17, 1966, Ser. No. 520,878
Claims priority, application Japan, Jan. 22, 1965, 40/2,995
Int. Cl. C07c *119/00, 119/04*
U.S. Cl. 260—453         1 Claim

ABSTRACT OF THE DISCLOSURE

A method of manufacturing toluene diisocyanate comprising dissolving 5 to 18% by weight of the corresponding diamine in an inert organic solvent, maintaining the solution to from 40 to 150° C. while introducing hydrogen chloride thereto. The diamine is thus subjected to hydrochlorination until the conversion rate of the diamine to hydrochloride reaches 30 to 95%, whereby a slurry containing the diamine hydrochloride is obtained, said slurry being contacted with phosgene.

---

The invention relates to a method of the manufacture of organic polyisocyanate. More particularly, the invention relates to a method for the manufacture of organic polyisocyanate in which the reaction of polyprimary amine hydrochloride with phosgene takes place.

In the prior art, the manufacture of organic isocyanates has been made usually by the reaction of a primary amine corresponding to the desired isocyanate with phosgene. Such a method, however, has a disadvantage to lower the yield of organic isocyanate to 85 to 90 percent because of the formation of urea resulted from the reaction of unreacted amine with prepared isocyanate. To solve this problem there has been proposed a method in which amine is subjected to hydrochlorination and the resulted amine hydrochloride is employed for the reaction with phosgene thereby the formation of urea-type compounds is avoided. However, the employment of amine hydrochloride incures a slower reaction velocity, need of a substantial quantity of solvent, a higher temperature in the reaction which must be maintained for a longer period of time resulting in deterioration of isocyanate radicals and a lower yield in the order of 80 to 90 percent as in the case where amine is employed. Hence, also this method is unsatisfactory from an industrial view point.

With a view to overcome the abovementioned disadvantages the authors made extensive studies on a method of large-scale production of polyisocyanate with good yield which have led to our discovery that a method in which the conversion rate of amine to hydrochloride is restricted within certain limits and the resulted slurry is subjected to phosgenation to produce isocyanate with good yield at a higher reaction velocity. It will be understood that the term "the conversion rate of amine to hydrochloride" implies the proportion in percentage of the number of amino-hydrochloride radicals ($NH_2 \cdot HCl$) converted from amino radicals contained in organic polyprimary amine against the number of all amine radicals contained in the latter. For further illustration, assume that as for example 6 amino radicals out of 10 amino radicals contained in 5 molecules of toluenediamine are converted to amino-hydrochloride radicals by hydrochlorination, then "the conversion rate of amine to hydrochloride" represents 60 percent.

The present invention provides a method of manufacturing organic polyisocyanate which is characterized in dissolving an organic polyprimary amine by 5–18% by weight in an inert organic solvent, introducing to the resultant solution hydrogen chloride at a temperature in the range 40–150° C., subjecting the said polyamine to hydrochlorination until the conversion rate of amine to hydrochloride reaches 30–95% to obtain a slurry containing polyamine hydrochloride and causing said slurry to come in contact with phosgene.

Polyamines employed in the method according to the invention include organic primary amines which have 2 amino radicals or more and which may be converted to isocyanate, especially organic polyamines such as benzidine, phenylene diamine, diaminotoluene, xylenediamine, naphthalenediamine, 4,4' - diaminodiphenylmethane, 4,4',4" - triaminotriphenylmethane, and aliphatic polyamine such as diaminohexane, diaminobutane, diaminooctane, diaminoundecane, and diaminooctadecane. These polyamines may be employed individually or in the form of a mixture thereof.

Organic solvents employed in the method of the invention which are inert with hydrogen chloride, phosgene, and isocyanate include aromatic hydrocarbons such as benzene, toluene, xylene, chlorinated aromatic hydrocarbons such as monochlorobenzene, dichlorobenzene, petroleum hydrocarbon such as ligroin, chloroform and carbon tetrachloride.

If an amine is dissolved in said inert organic solvent and reacts with hydrogen chloride, the amine is converted to mono-, di-, or tri-amine hydrochloride in proportions which vary dependently of the quantity of introduced hydrogen chloride. A higher concentration of amine in the solvent is preferred.

The viscosity of the said slurry which is greatly affected by the concentration of amine in an inert organic solvent and the degree of hydrochlorination varies more or less, dependently of the kind of amine employed, the degree of hydrochlorination, the operation temperature and the kind of solvent employed. In accordance with our invention, the concentration of amine in an inert organic solvent is kept at 5 to 18 percent by weight so as to maintain the viscosity below 30 cp.

In the case where the concentration of amine in a solvent exceeds 18 percent by weight and the amine is allowed to react with hydrogen chloride for hydrochlorination, there occurs in the resulted slurry the localization of free amine, or amine mono- or di- or tri-hydrochloride which may bring about the formation of secondary reaction product of phosgenation reaction of the amine hydrochloride. Further, if the concentration of amine exceeds 18 percent by weight, difficulties arise in alleviating superheat to effect the reaction of amine with hydrogen chloride at a desired temperature for that the said reaction is considerably exothermic. On the other hand, the reaction with a lower concentration of amine below 5 percent by weight is easy to take place but is uneconomical because of the need of an enormous plant.

The quantity of hydrogen chloride introduced to an organic solvent containing amine in the range from 5 to 18 percent by weight should be regulated so as to keep "the conversion rate of said amine to hydrochloride" in the range from 30 to 95 percent. The introduction of hydrogen chloride to an amine solution results in the formation of small particles of hydrochloride. These small particles increase in the number with the increase in the quantity of hydrogen chloride introduced while enhancing the viscosity of said solution. The small particles are comprised of a mixture of amine monohydrochloride, amine dihydrochloride and amine trichloride, and the proportions of them in the mixture vary dependently of the quantity of hydrogen chloride introduced. The viscosity of the solution increases with the increase in the formation of amine dihydrochloride and amine trihydrochloride. Hence, it is needful to restrict the conversion rate of amine to hydrochloride below 95 percent in order that the viscosity of the solution is kept below 30 cp. which is critical in the industrial practice and a high yield is acquired. In the case where said conversion rate exceeds 95 percent it is advisable to discontinue the operation. With the rise in the conversion rate of amine to hydrochloride the space of time required for completion of phosgenation will become longer incurring a lower yield. In view of the need of a plant of greater size for a longer space of time required for the reaction, the restriction of the conversion rate of amine to hydrochloride to 95 percent is requisite from an industrial view point, too. On the other hand, the presence of a great amount of unreacted amine in a slurry of hydrochloride mixture gives rise to decrease in the length of reaction time but brings on the formation of unfavourable by-product having urea group which is derived from amine and isocyanate to decrease the yield of isocyanate. In order to overcome such disadvantage, it is necessary to set the allowable lower limit of amount of unreacted amine at 40 mol percent and the conversion rate of amine to hydrochloride must not be below 30 percent. For example, where the hydrochlorination is carried out with 30% conversion rate of amine to hydrochloride, the proportions in composition vary representing at least 40 mol percent of unreacted amine. With any method of phosgenation the unreacted amine is converted by 13 percent to urea-type compounds standing for 87 percent or less of yield. Lowering the conversion rate of amine to hydrochloride below said value gives rise to increase in the amount of unreacted amine resulting in decrease in yield.

Hydrogen chlorides applicable to the method of the invention include such hydrogen chloride as resulted from the reaction of electrolytic hydrogen with chlorine and hydrogen chloride gas resulted from vapourization of hydrochloric acid produced as a by-product in various types of plant. In this connection it is to be noted that the presence of water and/or oxygen in hydrogen chloride gives unfavourable results, that is to say, in the subsequent step to phosgenation the water contained reacts with isocyanate to lower the efficiency of phosgenation and the presence of oxygen brings on deterioration of polyamine. Therefore, it is desirable to remove both of the water and oxygen contained in hydrogen chloride before using it. In industrial practice, hydrogen gas produced during the course of phosgenation reaction is preferably purified for circulation. In this connection it is to be noted that the concentration of phosgene in percent by volume in hydrogen chloride recovered is preferably kept below 2 on the grounds that only a small amount of phosgene gas existing in hydrochloric acid gives rise to the formation of isocyanate in the course of the manufacture of slurry composed of amine hydrochloride and the formation of urea-type compounds as a result of secondary reaction which lowers the yield while causing inconvenience to operation.

There is no need to place restrictions on the temperature at which the neutralization reaction of amine and hydrogen chloride introduced to a solution of organic inert solvent takes place in that said reaction proceeds so rapid, irrespectively of the operation temperature, and that the viscosity of slurry of amine hydrochloride mixture is not virtually affected by the operation temperature. The viscosity is affected to a greater extent by the degree of hydrochlorination of amine and the concentration of amine in the solvent. However, in order to enhance the solubility of amine in an organic inert solvent it is needful to employ a temperature higher than 40° C. for reaction, otherwise crystallization of amine itself is liable to occur, and if amine is crystallized hydrochlorination takes places only on the surfaces of crystallized amine particles while leaving the interior as unreacted to give rise to the formation of secondary reaction products in the course of phosgenation. At a temperature higher than 150° C., the contamination of hydrogen chloride by oxygen presenting even in a small amount must be avoided in that the polyamine is deteriorated by the rapid reaction with oxygen. Otherwise, the isocyanate cannot be obtained at a desired yield and the content of acid compounds in the isocyanate formed tends to increase. Further, it is to be noted that the contamination of hydrogen chloride by oxygen must be avoided to the utmost on the ground that the tarry material produced as a result of the reaction of amine with oxygen obstructs the operation in various aspects. Accordingly, it is needed to restrict the operation temperature in the range 40–150° C. unless inert antioxidant suitable for phosgenation is available. In view of the considerable influence on phosgenation the smallest particle size of slurry of amine hydrochloride mixture is preferred. However, under the aforementioned conditions, that is, the concentration of amine in an organic solvent is in the range 5–18%, the conversion rate of amine to hydrochloride in the range 30–95%, and the reaction temperature in the range 40–150° C., a slurry of hydrochloride having particle size under $100\mu$ is manufactured by the conventional industrial operation. This slurry is subjected to phosgenation by a conventional method, followed by removal of produced gases and subsequent partial distillation to give organic polyisocyanate with a high yield from 95 to 98 percent without appreciable secondary recation products.

The invention will now be illustrated in further details by reference to some embodiments wherein "part" implies "part by weight."

Example 1

122 parts of toluene diamine (2,6-type 35%, 2,4-type 65%) and 678 parts of o-dichlorobenzene were charged into a 1 litre reactor made of glass having a reflux condenser, stirrer and gas-blow pipe. The liquid was heated to 80° C. under stirring. When the toluene diamine was dissolved 65 parts of dry hydrogen chloride gas were gradually fed to the reactor through the gas-blow pipe.

Immediately after the feed of gas crystals of amine hydrochloride were separated rendering the whole a slurry and the temperature rose to some extent. During the reaction the temperature was kept in the range 80–90° C. and stirring was continued for 1 hour after the completion of feed of hydrogen chloride gas. Crystals in the slurry of amine hydrochloride had a particle size below $10\mu$ and viscosity of about 12 cp. (80° C.), the hydrochloride being composed of monohydrochloride 25 (mol) percent and dihydrochloride 75 (mol) percent, and no unreacted diamine was detected. The conversion rate of amine to hydrochloride was calculated at 87.5%. Then, the temperature of liquid was maintained at 80° C. under stirring for effecting reaction while introducing phosgene gas at an average rate of 100 parts per hour through the gas blow pipe. After about 10.8 hours unreacted amine suspended in the reaction liquid disappeared rendering the liquid transparent. At this time the gas chromatography indicated no appreciable difference between the amounts of phosgene at the inlet and outlet of the reactor, suggesting that no phosgene gas was wasted in the reactor and the phosgenation was completed. Hence, the feed of phosgene gas was discontinued, then dry nitrogen gas was fed through the said pipe, and the phosgene and hydrochloric acid gas remaining dissolved were removed to obtain 171 parts of toluene diisocyanate by partial distillation which correspond to 98% yield against amine.

With the 100% conversion rate of toluene diamine to hydrochloride, the viscosity of the hydrochloride slurry became too high to carry out subsequent operation.

Example 2

The same reactor as in Example 1 was employed. 61 parts of 2,4-toluene diamine and 500 parts of chlorobenzene were charged into the reactor and heated under stirring to which were introduced 22 parts of dry hydrogen chloride gas at 80° C. The viscosity of a slurry of amine hydrochloride produced represented about 100 cp. (80° C.), the conversion rate of said diamine to hydrochloride was calculated at 59%, and 5 (mol) percent of diamine was found unreacted. The reactor was then cooled to room temperatures, 100 parts of liquid phosgene were added thereto, and heated again under stirring. When the liquid temperature reached 50° C. gaseous phosgene was introduced to the reactor through the gas-blow pipe at the rate of 69 parts per hour while heating the reactor at the rate of 5° C. per hour until it reached 90° C. The reactor was further heated up to 130° C. in 30 minutes and the heating further continued for 2 hours at 130° C. When the reaction liquid became perfectly transparent the blowing-in of phosgene was discontinued. The total amount of gaseous phosgene blown in measured 513 parts. After the removal of gases the reaction liquid was subjected to fractional distillation to obtain 83.5 parts of toluene diisocyanate which correspond to 96.1% yield.

The same processes carried out with the 100% conversion rate of said diamine to hydrochloride resulted in 91.5% yield of toluene diisocyanate.

Example 3

The same reactor as in Example 1 was employed. 79 parts of 1,5-naphthalene diamine and 700 parts of o-dichlorobenzene were charged into the reactor and heated under stirring. 32 parts of dry hydrochloric acid gas were introduced at 90° C. The amine hydrochloride slurry thus produced represented 87% conversion rate of said diamine to hydrochloride and no unreacted diamine was detected.

The reactor was cooled to room temperatures to which were added 100 parts of liquid phosgene and heated under stirring. When the temperature reached 70° C. the blowing-in of gaseous phosgene started to carry out reaction at 70° C. for 5 hours and at 90° C. for 5 hours. The temperature was further elevated to 150° C. to carry out phosgenation for 1 hour. The blowing-in of gaseous phosgene discontinued. The total amount of gaseous phosgene blown in measured 1050 parts. The analyses of the reaction liquid by use of n-butylamine indicated production of 100.5 parts of 1,5-naphthalene diisocyanate, implying 95.7% yield against amine.

The same processes carried out with the 100% conversion rate of 1,5-naphthalene diamine to hydrochloride resulted in 93.0% yield of 1,5-naphthalene diisocyanate against amine.

Example 4

The same reactor as in Example 1 was employed. 49.5 parts of 4,4'-diamino diphenylmethane and 445 parts of o-dichloroenzene were charged into the reactor and heated under stirring to which were added 15 parts of dry hydrochloric acid was at 100° C. The slurry of hydrochloride thus produced comprised 58.3 mol. percent monohydrochloride and 41.7 mol. percent of dihydrochloride. The conversion rate of amine to hydrochloride was calculated at 70.9% and no unreacted diamine was detected. The liquid temperature was maintained at 110° C. under stirring and gaseous phosgene was blown in at the rate of 100 parts per hour for about 3 hours to carry out phosgenation.

After the removal of gases the reaction liquid was subjected to fractional distillation to obtain 59 parts of 4,4'-diphenylmethane diisocyanate which correspond to 95.2% yield. The same processes carried out with the 100% convesion rate of 4,4'-diaminodiphenylmethane to hydrochloride resulted in 92.8% yield of 4,4'-diphenylmethane diisocyanate.

Example 5

The same reactor as in Example 1 was employed.

116 parts of hexamethylene diamine and 650 parts of chlorobenzene were charged into the reactor and heated under stirring up to 70° C. for dissolution, and 36 parts of dry gaseous hydrochloride acid were introduced thereto. The amine hydrochloride slurry thus produced comprised 18 mol percent of hexamethylene diamine, 67 mol percent monohydrochloride and 15 mol percent of dihydrochloride, showing 48.4 percent conversion rate of diamine to hydrochloride.

Gaseous phosgene was then introduced to the reactor at 100° C. for phosgenation. The total amount of gaseous phosgene measured 1,100 parts. The gas chromatography analysis of the degasified reaction liquid indicated that 163 parts of hexamethylene diisocyanate corresponding to 97% yield were produced. The phosgenation which was carried out under the same conditions upon completion of hydrochlorination resulted in only 90.2% yield against amine.

What we claim is:

1. A method of manufacturing toluene diisocyanate comprising dissolving 5 to 18% by weight of toluene diamine in an inert organic solvent, maintaining the result liqiud at a temperature in the range from 40 to 150° C. while introducing hydrogen chloride thereto to subject the said diamine to hydrochlorination until the conversion rate of said diamine to hydrochloride reaches 30% to 95% whereby a slurry containing hydrochloride of said diamine is obtained, and causing said slurry to come in contact with phosgene.

References Cited

UNITED STATES PATENTS

| | | | |
|---|---|---|---|
| 2,319,057 | 5/1943 | Hanford | 260—453 |
| 2,362,648 | 11/1944 | Lichty et al. | 260—453 |
| 2,644,007 | 6/1953 | Irwin | 260—453 |
| 2,938,054 | 5/1960 | Demers et al. | 260—453 XR |

CHARLES B. PARKER, Primary Examiner

D. A. TORRENCE, Assistant Examiner

U.S. Cl. X.R.

260—570, 391, 583, 578, 579